US009652306B1

(12) United States Patent
Wagner et al.

(10) Patent No.: US 9,652,306 B1
(45) Date of Patent: May 16, 2017

(54) EVENT-DRIVEN COMPUTING

(71) Applicant: Amazon Technologies, Inc., Seattle, WA (US)

(72) Inventors: Timothy Allen Wagner, Seattle, WA (US); Ajay Nair, Seattle, WA (US); Marc John Brooker, Seattle, WA (US); Scott Daniel Wisniewski, Edmonds, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/869,879

(22) Filed: Sep. 29, 2015

(51) Int. Cl.
G06F 3/00 (2006.01)
G06F 9/44 (2006.01)
G06F 9/46 (2006.01)
G06F 13/00 (2006.01)
G06F 9/54 (2006.01)
G06F 9/455 (2006.01)

(52) U.S. Cl.
CPC .......... *G06F 9/542* (2013.01); *G06F 9/45558* (2013.01); *G06F 2009/45575* (2013.01)

(58) Field of Classification Search
None
See application file for complete search history.

(56) References Cited

U.S. PATENT DOCUMENTS

| 5,283,888 | A  | 2/1994  | Dao et al. |
| 5,970,488 | A  | 10/1999 | Crowe et al. |
| 6,708,276 | B1 | 3/2004  | Yarsa et al. |
| 7,665,090 | B1 | 2/2010  | Tormasov et al. |
| 7,707,579 | B2 | 4/2010  | Rodriguez |
| 7,823,186 | B2 | 10/2010 | Pouliot |
| 7,886,021 | B2 | 2/2011  | Scheifler et al. |
| 8,010,990 | B2 | 8/2011  | Ferguson et al. |
| 8,024,564 | B2 | 9/2011  | Bassani et al. |

(Continued)

FOREIGN PATENT DOCUMENTS

| EP | 2663052 A1 | 11/2013 |
| WO | WO 2009/137567 A1 | 11/2009 |

(Continued)

OTHER PUBLICATIONS

Adapter pattern—Wikipedia, the free encyclopedia, Apr. 4, 2015, XP055275559, Retrieved from the Internet: URL:https://en.wikipedia.org/w/index.php?title=Adapter_pattern&oldid=654971255 [retrieved on May 26, 2016] the whole document.

(Continued)

*Primary Examiner* — Craig Dorais
(74) *Attorney, Agent, or Firm* — Knobbe, Martens, Olson & Bear, LLP

(57) ABSTRACT

A service manages a plurality of virtual machine instances for low latency execution of user codes. The service can provide the capability to execute user code in response to events triggered on various event sources and initiate execution of other control functions to improve the code execution environment in response to detecting errors or unexpected execution results. The service may maintain or communicate with a separate storage area for storing code execution requests that were not successfully processed by the service. Requests stored in such a storage area may subsequently be re-processed by the service.

17 Claims, 4 Drawing Sheets

(56) References Cited

U.S. PATENT DOCUMENTS

| | | | |
|---|---|---|---|
| 8,046,765 B2 | 10/2011 | Cherkasova et al. | |
| 8,065,676 B1 | 11/2011 | Sahai et al. | |
| 8,095,931 B1 | 1/2012 | Chen et al. | |
| 8,166,304 B2 | 4/2012 | Murase et al. | |
| 8,171,473 B2 | 5/2012 | Lavin | |
| 8,336,079 B2 | 12/2012 | Budko et al. | |
| 8,429,282 B1 | 4/2013 | Ahuja | |
| 8,448,165 B1 | 5/2013 | Conover | |
| 8,725,702 B1 | 5/2014 | Raman et al. | |
| 8,756,696 B1 | 6/2014 | Miller | |
| 8,825,964 B1 | 9/2014 | Sopka et al. | |
| 9,027,087 B2 | 5/2015 | Ishaya et al. | |
| 9,146,764 B1 | 9/2015 | Wagner | |
| 9,208,007 B2 | 12/2015 | Harper et al. | |
| 9,323,556 B2 | 4/2016 | Wagner | |
| 9,413,626 B2 | 8/2016 | Reque et al. | |
| 9,471,775 B1 | 10/2016 | Wagner et al. | |
| 9,483,335 B1 | 11/2016 | Wagner | |
| 2004/0249947 A1 | 12/2004 | Novaes et al. | |
| 2005/0044301 A1* | 2/2005 | Vasilevsky | G06F 9/45533 711/1 |
| 2005/0132368 A1 | 6/2005 | Sexton et al. | |
| 2007/0094396 A1 | 4/2007 | Takano et al. | |
| 2007/0130341 A1 | 6/2007 | Ma | |
| 2008/0028409 A1 | 1/2008 | Cherkasova et al. | |
| 2008/0126110 A1* | 5/2008 | Haeberle | G06F 11/2257 717/168 |
| 2008/0126486 A1 | 5/2008 | Heist | |
| 2008/0189468 A1 | 8/2008 | Schmidt et al. | |
| 2008/0201711 A1 | 8/2008 | Amir Husain | |
| 2009/0055810 A1 | 2/2009 | Kondur | |
| 2009/0077569 A1 | 3/2009 | Appleton et al. | |
| 2009/0158275 A1 | 6/2009 | Wang et al. | |
| 2009/0198769 A1 | 8/2009 | Keller et al. | |
| 2009/0204964 A1 | 8/2009 | Foley et al. | |
| 2009/0300599 A1 | 12/2009 | Piotrowski | |
| 2010/0023940 A1 | 1/2010 | Iwamatsu et al. | |
| 2010/0031274 A1 | 2/2010 | Sim-Tang | |
| 2010/0031325 A1 | 2/2010 | Maigne et al. | |
| 2010/0122343 A1 | 5/2010 | Ghosh | |
| 2010/0186011 A1 | 7/2010 | Magenheimer | |
| 2010/0198972 A1 | 8/2010 | Umbehocker | |
| 2010/0269109 A1 | 10/2010 | Cartales | |
| 2011/0029970 A1 | 2/2011 | Arasaratnam | |
| 2011/0055378 A1 | 3/2011 | Ferris et al. | |
| 2011/0055396 A1 | 3/2011 | DeHaan | |
| 2011/0099551 A1 | 4/2011 | Fahrig et al. | |
| 2011/0134761 A1 | 6/2011 | Smith | |
| 2011/0141124 A1 | 6/2011 | Halls et al. | |
| 2011/0153838 A1 | 6/2011 | Belkine et al. | |
| 2011/0184993 A1 | 7/2011 | Chawla et al. | |
| 2011/0265164 A1 | 10/2011 | Lucovsky | |
| 2012/0054744 A1 | 3/2012 | Singh et al. | |
| 2012/0072914 A1 | 3/2012 | Ota | |
| 2012/0096468 A1 | 4/2012 | Chakravorty et al. | |
| 2012/0110155 A1 | 5/2012 | Adlung et al. | |
| 2012/0110164 A1 | 5/2012 | Frey et al. | |
| 2012/0110588 A1 | 5/2012 | Bieswanger et al. | |
| 2012/0192184 A1 | 7/2012 | Burckart et al. | |
| 2012/0233464 A1 | 9/2012 | Miller et al. | |
| 2012/0331113 A1 | 12/2012 | Jain et al. | |
| 2013/0054927 A1 | 2/2013 | Raj et al. | |
| 2013/0097601 A1 | 4/2013 | Podvratnik et al. | |
| 2013/0111469 A1 | 5/2013 | B et al. | |
| 2013/0151648 A1 | 6/2013 | Luna | |
| 2013/0179574 A1 | 7/2013 | Calder et al. | |
| 2013/0179894 A1 | 7/2013 | Calder et al. | |
| 2013/0185729 A1 | 7/2013 | Vasic et al. | |
| 2013/0191924 A1 | 7/2013 | Tedesco | |
| 2013/0198319 A1 | 8/2013 | Shen et al. | |
| 2013/0219390 A1 | 8/2013 | Lee et al. | |
| 2013/0227641 A1 | 8/2013 | White et al. | |
| 2013/0232480 A1 | 9/2013 | Winterfeldt et al. | |
| 2013/0263117 A1 | 10/2013 | Konik et al. | |
| 2013/0297964 A1 | 11/2013 | Hegdal et al. | |
| 2013/0339950 A1 | 12/2013 | Ramarathinam et al. | |
| 2013/0346946 A1 | 12/2013 | Pinnix | |
| 2013/0346987 A1 | 12/2013 | Raney et al. | |
| 2014/0007097 A1 | 1/2014 | Chin et al. | |
| 2014/0019965 A1 | 1/2014 | Neuse et al. | |
| 2014/0019966 A1 | 1/2014 | Neuse et al. | |
| 2014/0040857 A1 | 2/2014 | Trinchini et al. | |
| 2014/0059226 A1 | 2/2014 | Messerli et al. | |
| 2014/0068611 A1 | 3/2014 | McGrath et al. | |
| 2014/0082165 A1 | 3/2014 | Marr et al. | |
| 2014/0101649 A1 | 4/2014 | Kamble et al. | |
| 2014/0109087 A1 | 4/2014 | Jujare et al. | |
| 2014/0130040 A1 | 5/2014 | Lemanski | |
| 2014/0173614 A1 | 6/2014 | Konik et al. | |
| 2014/0173616 A1 | 6/2014 | Bird et al. | |
| 2014/0180862 A1 | 6/2014 | Certain et al. | |
| 2014/0201735 A1* | 7/2014 | Kannan | G06F 9/45558 718/1 |
| 2014/0215073 A1 | 7/2014 | Dow et al. | |
| 2014/0245297 A1 | 8/2014 | Hackett | |
| 2014/0279581 A1 | 9/2014 | Devereaux | |
| 2014/0282615 A1 | 9/2014 | Cavage et al. | |
| 2014/0289286 A1 | 9/2014 | Gusak | |
| 2014/0304698 A1 | 10/2014 | Chigurapati et al. | |
| 2014/0380085 A1* | 12/2014 | Rash | G06F 11/0772 714/3 |
| 2015/0074659 A1 | 3/2015 | Madsen et al. | |
| 2015/0120928 A1 | 4/2015 | Gummaraju et al. | |
| 2016/0072727 A1 | 3/2016 | Leafe et al. | |
| 2016/0092250 A1 | 3/2016 | Wagner et al. | |
| 2016/0092252 A1 | 3/2016 | Wagner | |
| 2016/0098285 A1 | 4/2016 | Davis et al. | |
| 2016/0164797 A1 | 6/2016 | Reque et al. | |
| 2016/0224360 A1 | 8/2016 | Wagner et al. | |
| 2016/0224785 A1 | 8/2016 | Wagner et al. | |
| 2016/0239318 A1 | 8/2016 | Wagner | |
| 2016/0299790 A1 | 10/2016 | Thompson | |
| 2016/0301739 A1 | 10/2016 | Thompson | |

FOREIGN PATENT DOCUMENTS

| | | |
|---|---|---|
| WO | WO 2016/053950 A1 | 4/2016 |
| WO | WO 2016/053968 A1 | 4/2016 |
| WO | WO 2016/053973 A1 | 4/2016 |
| WO | WO 2016/090292 | 6/2016 |
| WO | WO 2016/126731 | 8/2016 |
| WO | WO 2016/164633 | 10/2016 |
| WO | WO 2016/164638 | 10/2016 |

OTHER PUBLICATIONS

Czajkowski et al., Multitasking without compromise: a virtual machine evolution, Apr. 2012, 14 pages.
Dombrowski et al., Dynamic monitor allocation in the Java virtual machine, Oct. 2013, 8 pages.
Espadas, J., et al., A Tenant-Based Resource Allocation Model for Scaling Software-as-a-Service Applications Over Cloud Computing Infrastructures, Future Generation Computer Systems 29.1, pp. 273-286, 2013.
Qian et al., Estimating optimal cost of allocating virtualized resources with dynamic demand, Sep. 2011, 2 pages.
Shim (computing)—Wikipedia, the free encyclopedia, Apr. 4, 2015, XP055275558 [retrieved on May 26, 2016].
Vaquero et al. "Dynamically scaling applications in the cloud." ACM SIGCOMM Computer Communication Review 41.1 (2011): pp. 45-52. Retrieved on [Apr. 21, 2016] Retrieved from the Internet: URL<http://dl.acm.org/citation.cfm?id=1925869>.
International Search Report and Written Opinion in PCT/US2015/052810 dated Dec. 17, 2015, 18 pages
International Search Report and Written Opinion in PCT/US2015/052838 dated Dec. 18, 2015, 23 pages.
International Search Report and Written Opinion in PCT/US2015/052833 dated Jan. 13, 2016, 17 pages.
International Search Report and Written Opinion in PCT/US2015/064071 dated Mar. 16, 2016, 17 pages.

(56) References Cited

OTHER PUBLICATIONS

International Search Report and Written Opinion in PCT/US2016/016211 dated Apr. 13, 2016 11 pages.
International Search Report and Written Opinion in PCT/US2016/026514 dated Jun. 8, 2016, 20 pages.
International Search Report and Written Opinion in PCT/US2016/026520 dated Jul. 5, 2016.

* cited by examiner

EVENT-DRIVEN COMPUTING

CROSS-REFERENCE TO OTHER APPLICATIONS

The present application's Applicant previously filed the following U.S. patent application No. 14/502,648 on Sep. 30, 2014.

The disclosure of the above-referenced application is hereby incorporated by reference in its entirety.

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies may allow a single physical computing device to host one or more instances of virtual machines that appear and operate as independent computing devices to users of a data center. With virtualization, the single physical computing device can create, maintain, delete, or otherwise manage virtual machines in a dynamic manner. In turn, users can request computer resources from a data center, including single computing devices or a configuration of networked computing devices, and be provided with varying numbers of virtual machine resources.

In some scenarios, virtual machine instances may be configured according to a number of virtual machine instance types to provide specific functionality. For example, various computing devices may be associated with different combinations of operating systems or operating system configurations, virtualized hardware resources and software applications to enable a computing device to provide different desired functionalities, or to provide similar functionalities more efficiently. These virtual machine instance type configurations are often contained within a device image, which includes static data containing the software (e.g., the OS and applications together with their configuration and data files, etc.) that the virtual machine will run once started. The device image is typically stored on the disk used to create or initialize the instance. Thus, a computing device may process the device image in order to implement the desired software configuration.

BRIEF DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein.

DETAILED DESCRIPTION

Figure 1:
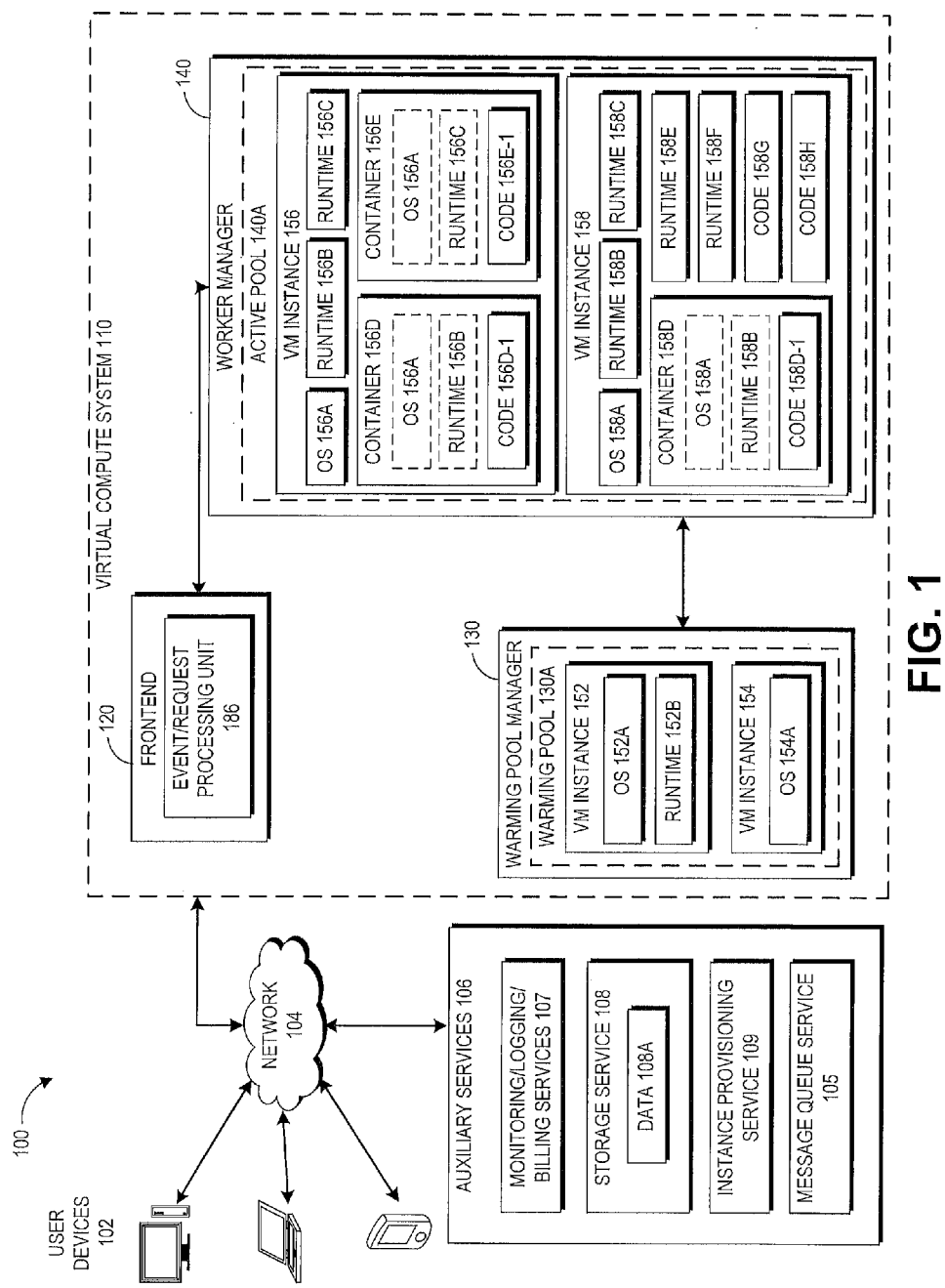
FIG. 1 is a block diagram depicting an illustrative environment for processing event messages for user requests to execute program codes in a virtual compute system.

Companies and organizations no longer need to acquire and manage their own data centers in order to perform computing operations (e.g., execute code, including threads, programs, functions, software, routines, subroutines, processes, etc.). With the advent of cloud computing, storage space and compute power traditionally provided by hardware computing devices can now be obtained and configured in minutes over the Internet. Thus, developers can quickly purchase a desired amount of computing resources without having to worry about acquiring physical machines. Such computing resources are typically purchased in the form of virtual computing resources, or virtual machine instances. These instances of virtual machines are software implementations of physical machines (e.g., computers), which are hosted on physical computing devices, and may contain operating systems and applications that are traditionally provided on physical machines. These virtual machine instances are configured with a set of computing resources (e.g., memory, CPU, disk, network, etc.) that applications running on the virtual machine instances may request and can be utilized in the same manner as physical computers.

However, even when virtual computing resources are purchased (e.g., in the form of virtual machine instances), developers still have to decide how many and what type of virtual machine instances to purchase, and how long to keep them. For example, the costs of using the virtual machine instances may vary depending on the type and the number of hours they are rented. In addition, the minimum time a virtual machine may be rented is typically on the order of hours. Further, developers have to specify the hardware and software resources (e.g., type of operating systems and language runtimes, etc.) to install on the virtual machines. Other concerns that they might have include over-utilization (e.g., acquiring too little computing resources and suffering performance issues), under-utilization (e.g., acquiring more computing resources than necessary to run the codes, and thus overpaying), prediction of change in traffic (e.g., so that they know when to scale up or down), and instance and language runtime startup delay, which can take 3-10 minutes, or longer, even though users may desire computing capacity on the order of seconds or even milliseconds.

There may be services that provide such users with low latency compute capacity that can be utilized to execute their program codes by maintaining a pool of pre-initialized virtual machine instances that are ready for use as soon as a user request is received, delay (sometimes referred to as latency) associated with executing the user code (e.g., instance and language runtime startup time) can be significantly reduced.

In some implementations, code execution on such a virtual compute system can be triggered by one or more events that occur. For example, a trigger (which can be a piece of code that is configured to automatically respond to certain events occurring on the virtual compute system or at an external or auxiliary service) can be created, and when such events occur, the trigger may automatically cause an action to be performed (e.g., by generating a code execution request and sending it to the frontend of the virtual compute system). The systems or services where such a trigger resides may be referred to as an "event source," Services that may operate as event sources include, but are not limited to, remote storage systems; database systems; message queue systems; data stream services; web services; auditing services; health monitoring services (e.g., for monitoring health status of a virtual compute system); logging services; billing services; resource management systems and services, or any other services or user-defined applications. When an event specified by the trigger occurs at such an event source (e.g., upload of a new file, modification of existing data in a table, new data stream record is received, etc.), a corresponding program code may be caused to execute on the virtual compute system. The program code may perform any actions specified by the user who generated the trigger or by the virtual compute system, such as sending a notification or initiating a workflow. For example, a trigger can be configured to generate an event every time a given database is modified. In such an example, the triggered events can each cause the database modification to be recorded in permanent storage to create an audit trail of the activity in the database (e.g., by causing a program code configured to perform such storing operation to be executed). The events may further cause a program code that sends a notification to the administrator of the database to be executed on the virtual compute system.

However, the actions performed by the triggered code execution (e.g., logging data, sending notifications, etc.) are static in nature and often require a human operator to analyze the data and take further steps to improve, for example, the code execution performance. Thus, an improved method of processing events and code execution requests in a more dynamic and automatic fashion while maintaining low latency and high scalability is desired.

Generally described, aspects of the present disclosure relate to the management of virtual machine instances and containers created therein. Specifically, systems and methods are disclosed which facilitate management of virtual machine instances in a virtual compute system. The virtual compute system maintains a pool of virtual machine instances that have one or more software components (e.g., operating systems, language runtimes, libraries, etc.) loaded thereon. Maintaining the pool of virtual machine instances may involve creating a new instance, acquiring a new instance from an external instance provisioning service, destroying an instance, assigning/reassigning an instance to a user, modifying an instance (e.g., containers or resources therein), etc. The virtual machine instances in the pool can be designated to service user requests to execute program codes. In the present disclosure, the phrases "program code," "user code," and "cloud function" may sometimes be interchangeably used. The program codes can be executed in isolated containers that are created on the virtual machine instances. Since the virtual machine instances in the pool have already been booted and loaded with particular operating systems and language runtimes by the time the requests are received, the delay associated with finding compute capacity that can handle the requests (e.g., by executing the user code in one or more containers created on the virtual machine instances) is significantly reduced.

In certain embodiments, a message queue, a message bus, or any other message intermediary service is provided to facilitate transportation or communication of event messages generated in a first programmatic environment (e.g., at an auxiliary service) to the programmatic environment provided by the virtual compute system described herein. To further facilitate propagation and transportation of a triggered event from the first programmatic environment to the virtual compute system, event messages may be generated to include information descriptive of the triggered event, a user associated with a request to execute user code in response to the triggered event, and programmatic information to enable the virtual compute system to convert the event message into a user request for further processing by the virtual compute system. The event message and/or programmatic information contained therein may be structured according to a schema, a code model, or an application programming interface ("API") to facilitate both creation/generation of the event message at the auxiliary service and conversion/processing of the event message at the virtual compute system. In some instances, the phrases "events," "event messages," and "code execution requests" may be used interchangeably in the present disclosure.

In another aspect, a virtual compute system may maintain a pool of virtual machine instances on one or more physical computing devices, where each virtual machine instance has one or more software components loaded thereon. When the virtual compute system receives a request to execute the program code of a user, which specifies one or more computing constraints for executing the program code of the user, the virtual compute system may select a virtual machine instance for executing the program code of the user based on the one or more computing constraints specified by the request and cause the program code of the user to be executed on the selected virtual machine instance.

One benefit provided by the systems and methods described herein is the ability to dynamically improve, update, or modify various aspects of the code execution environment with or without interaction with the users. For example, in response to detecting a negative trend, the virtual compute system may automatically execute certain control functions to remedy or reverse the negative trend. Such control functions may modify user functions or modify one or more parameters used for executing such user functions. For example, the virtual compute system may monitor and log information related to the amount of resources allocated for executing user code. By doing so, the virtual compute system may be able to identify opportunities for improving the performance of the user code execution by adjusting the amount of allocated resources. Error rates may be reduced by increasing the amount of allocated resources in the event of over-utilization, and costs associated with executing the user code may be reduced by decreasing the amount of allocated resources in the event of under-utilization. Thus, rather than writing code execution errors in an error log or sending a notification to the user when the user's functions are failing to execute properly, the systems and methods described herein provide a dynamic and automated solution to address such errors and failures.

Specific embodiments and example applications of the present disclosure will now be described with reference to the drawings. These embodiments and example applications are intended to illustrate, and not limit, the present disclosure.

Illustrative Environment including Virtual Compute System

With reference to FIG. 1, a block diagram illustrating an embodiment of a virtual environment 100 will be described. The example shown in FIG. 1 includes a virtual environment 100 in which users (e.g., developers, etc.) of user computing devices 102 may run various program codes using the virtual computing resources provided by a virtual compute system 110.

By way of illustration, various example user computing devices 102 are shown in communication with the virtual compute system 110, including a desktop computer, laptop, and a mobile phone. In general, the user computing devices 102 can be any computing device such as a desktop, laptop, mobile phone (or smartphone), tablet, kiosk, wireless device, and other electronic devices. In addition, the user computing devices 102 may include web services running on the same or different data centers, where, for example, different web services may programmatically communicate with each other to perform one or more techniques described herein. Further, the user computing devices 102 may include Internet of Things (IoT) devices such as Internet appliances and connected devices. The virtual compute system 110 may provide the user computing devices 102 with one or more user interfaces, command-line interfaces (CLI), application programming interfaces (API), and/or other programmatic interfaces for generating and uploading user codes, invoking the user codes (e.g., submitting a request to execute the user codes on the virtual compute system 110), scheduling event-based jobs or timed jobs, tracking the user codes, and/or viewing other logging or monitoring information related to their requests and/or user codes. Although one or more embodiments may be described herein as using a user interface, it should be appreciated that such embodiments may, additionally or alternatively, use any CLIs, APIs, or other programmatic interfaces.

The user computing devices 102 access the virtual compute system 110 over a network 104. The network 104 may be any wired network, wireless network, or combination thereof. In addition, the network 104 may be a personal area network, local area network, wide area network, over-the-air broadcast network (e.g., for radio or television), cable network, satellite network, cellular telephone network, or combination thereof. For example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

The virtual compute system 110 is depicted in FIG. 1 as operating in a distributed computing environment including several computer systems that are interconnected using one or more computer networks. The virtual compute system 110 could also operate within a computing environment having a fewer or greater number of devices than are illustrated in FIG. 1. Thus, the depiction of the virtual compute system 110 in FIG. 1 should be taken as illustrative and not limiting to the present disclosure. For example, the virtual compute system 110 or various constituents thereof could implement various Web services components, hosted or "cloud" computing environments, and/or peer-to-peer network configurations to implement at least a portion of the processes described herein.

Further, the virtual compute system 110 may be implemented in hardware and/or software and may, for instance, include one or more physical or virtual servers implemented on physical computer hardware configured to execute computer executable instructions for performing various features that will be described herein. The one or more servers may be geographically dispersed or geographically co-located, for instance, in one or more data centers.

In the environment illustrated FIG. 1, the virtual environment 100 includes a virtual compute system 110, which includes a frontend 120 (including an event/request processing unit 186), a warming pool manager 130, and a worker manager 140. In the depicted example, virtual machine instances ("instances") 152, 154 are shown in a warming pool 130A managed by the warming pool manager 130, and instances 156, 158 are shown in an active pool 140A managed by the worker manager 140. The illustration of the various components within the virtual compute system 110 is logical in nature and one or more of the components can be implemented by a single computing device or multiple computing devices. For example, the instances 152, 154, 156, 158 can be implemented on one or more physical computing devices in different various geographic regions. Similarly, each of the frontend 120, the warming pool manager 130, and the worker manager 140 can be implemented across multiple physical computing devices. Alternatively, one or more of the frontend 120, the warming pool manager 130, and the worker manager 140 can be implemented on a single physical computing device. In some embodiments, the virtual compute system 110 may comprise multiple frontends, multiple warming pool managers, and/or multiple worker managers. Although four virtual machine instances are shown in the example of FIG. 1, the embodiments described herein are not limited as such, and one skilled in the art will appreciate that the virtual compute system 110 may comprise any number of virtual machine instances implemented using any number of physical computing devices. Similarly, although a single warming pool and a single active pool are shown in the example of FIG. 1, the embodiments described herein are not limited as such, and one skilled in the art will appreciate that the virtual compute system 110 may comprise any number of warming pools and active pools.

In the example of FIG. 1, the virtual compute system 110 is illustrated as being connected to the network 104. In some embodiments, any of the components within the virtual compute system 110 can communicate with other components (e.g., the user computing devices 102 and auxiliary services 106, which may include monitoring/logging/billing services 107, a storage service 108, an instance provisioning service 109, a message queue service 105, and/or other services that may communicate with the virtual compute system 110) of the virtual environment 100 via the network 104. In other embodiments, not all components of the virtual compute system 110 are capable of communicating with other components of the virtual environment 100. In one example, only the frontend 120 may be connected to the network 104, and other components of the virtual compute system 110 may communicate with other components of the virtual environment 100A via the frontend 120. In some embodiments, any of the auxiliary services 106 may be configured to operate as an event triggering service in order to listen for events specified by users of the auxiliary service and trigger generation of event messages for processing by the virtual compute system 110, as described in more detail herein. Thus, for example, the storage service 108 may be configured to operate as an event triggering service in order to provide the capability of executing user code on the virtual compute system 110 in response to events as they occur on the storage service 108.

In one embodiment, the auxiliary services 106 may be configured to associate an event or event type with a particular program code to be executed on the virtual compute system 110 (that is, the auxiliary services 106 may store or have access to data which associates the event with the particular program code). In another embodiment, the auxiliary services 106 may not necessarily associate an event or event type with a particular program code to be executed on the virtual compute system 110, but rather the auxiliary services 106 may generate event messages which the virtual compute system 110 is configured to interpret as being associated with the program code to be executed on the virtual compute system 110 (that is, the virtual compute system 110 may store or have access to data which associates the event with the particular program code). In another embodiment, an intermediary system or service may be configured to handle interpretation and routing of event messages to execute the program code, such that neither the auxiliary services 106 nor the virtual compute system 110 may store or have access to the event-to-program code association data. For example, the auxiliary services 106 may generate an event message that is agnostic to any particular program code to be executed; and the event message may be routed to the virtual compute system 110 (or an intermediary system) which evaluates the event message and associated metadata to determine which program code to execute in response, and initiate a corresponding request to execute the program code.

As mentioned above, any of the auxiliary services 106 may be configured to operate as an event triggering service. These include but are not limited to: remote storage systems; database systems; message queue systems (e.g., a message queue service provided by the virtual compute system 110, a message queue system owned and/or operated by a user or client separate from the virtual compute system 110, and so on); web services; auditing services; health monitoring services (e.g., for monitoring health status of a virtual compute system); logging services; billing services; resource management systems and services (e.g., for managing lifecycles and/or ownership of virtual computing environments and the like); and so on.

Users may use the virtual compute system 110 to execute user code thereon. For example, a user may wish to run a piece of code in connection with a web or mobile application that the user has developed. One way of running the code would be to acquire virtual machine instances from service providers who provide infrastructure as a service, configure the virtual machine instances to suit the user's needs, and use the configured virtual machine instances to run the code. Alternatively, the user may send a code execution request the virtual compute system 110. The virtual compute system 110 can handle the acquisition and configuration of compute capacity (e.g., containers, instances, etc., which are described in greater detail below) based on the code execution request, and execute the code using the compute capacity. The virtual compute system 110 may automatically scale up and down based on the volume, thereby relieving the user from the burden of having to worry about over-utilization (e.g., acquiring too little computing resources and suffering performance issues) or under-utilization (e.g., acquiring more computing resources than necessary to run the codes, and thus overpaying).

Frontend

The frontend 120 receives and processes all the requests (sometimes in the form of event messages) to execute user code on the virtual compute system 110. In one embodiment, the frontend 120 serves as a front door to all the other services provided by the virtual compute system 110. The frontend 120 processes the requests and makes sure that the requests are properly authorized. For example, the frontend 120 may determine whether the user associated with the request is authorized to access the user code specified in the request. In some embodiments, the frontend 120 may serve as a front door to fully automated services including the auxiliary services 106 as well as the virtual compute system 110 (e.g., code execution service). In such embodiments, how the frontend 120 processes incoming requests may differ based on the particular service(s) with which the frontend 120 is interacting. For example, the frontend 120 may treat code execution requests originating from the storage service 108 differently from the way the frontend 120 would treat code execution requests originating from the monitoring service 107.

The user code as used herein may refer to any program code (e.g., a program, routine, subroutine, thread, etc.) written in a specific program language. In the present disclosure, the terms "code," "user code," and "program code," may be used interchangeably. Such user code may be executed to achieve a specific task, for example, in connection with a particular web application or mobile application developed by the user. For example, the user codes may be written in JavaScript (node.js), Java, Python, and/or Ruby. The user code may be associated with a set of configurations. Such configurations may include information regarding how the user code will receive an event that may cause the user code to execute (e.g., event handler).

A request to execute user code may include the user code (or the location thereof) and one or more arguments to be used for executing the user code. For example, the user may provide the user code along with the request to execute the user code. In another example, the request may identify a previously uploaded program code (e.g., using the API for uploading the code) by its name or its unique ID. In yet another example, the code may be included in the request as well as uploaded in a separate location (e.g., the storage service 108 or a storage system internal to the virtual compute system 110) prior to the request is received by the virtual compute system 110. The virtual compute system 110 may vary its code execution strategy based on where the code is available at the time the request is processed.

The frontend 120 may receive the request to execute such user codes in response to Hypertext Transfer Protocol Secure (HTTPS) requests from a user. Also, any information (e.g., headers and parameters) included in the HTTPS request may also be processed and utilized when executing the user code. As discussed above, any other protocols, including, for example, HTTP, MQTT, and CoAP, may be used to transfer the message containing the code execution request to the frontend 120. The frontend 120 may also receive the request to execute such user codes when an event is detected, such as an event that the user has registered to trigger automatic request generation. For example, the user may configure an auxiliary service 106 to operate as an event triggering service by registering the user code with the auxiliary service 106 and specifying that whenever a particular event occurs (e.g., a new file is uploaded), the request to execute the user code is sent to the frontend 120. Alternatively, the user may have registered a timed job (e.g., execute the user code every 24 hours). In such an example, when the scheduled time arrives for the timed job, the request to execute the user code may be sent to the frontend 120. A timed or scheduled job may be implemented using the techniques of this disclosure to, for example, model the job as an event generated by a timer service. For example, the timer service may generate an event message indicating that it is now time to run a user code, and the virtual compute system 110 may implement a process to run code at a certain time by utilizing the timer service to remind the virtual compute system 110 to run the user code. In yet another example, the frontend 120 may include or have access to a queue of incoming code execution requests, and when the user's batch job is removed from the virtual compute system's work queue, the frontend 120 may process the user request. In yet another example, the request may originate from another component within the virtual compute system 110 or other servers or services not illustrated in FIG. 1.

In yet another example, the request may originate from another component within the virtual compute system 110 or other servers or services not illustrated in FIG. 1. In some embodiments, a request to execute/activate user codes may be generated in response to an event associated with the user computing device 102 or an auxiliary service 106. For example, in response to an end user uploading a new image from a user computing device to an auxiliary service (such as storage service 108) configured to operate as an event triggering service, the event triggering service can trigger a request to execute/activate a code to generate a thumbnail of the image. The code may be hosted in the active pool 120 or downloaded from a storage service storage service 108 to the virtual compute system 110. In some embodiments, the virtual compute system 110 (e.g., via the event/request processing unit 186), may generate an event message in response to a particular event occurring on the virtual compute system 110. For example, when the virtual compute system 110 (or a component thereof) detects that the available capacity in the active pool 140A has fallen below 10%, an event may be generated to send a notification to an administrator of the virtual compute system 110, send a message to the logging service 107 for logging the information, or send a request to the frontend 120 to initiate an active pool capacity adjustment process.

Message Queue Service

In any of the examples described above and throughout this disclosure, an event message representative of a request to execute the user code may be initially received by a message queue service 105 and provided to or placed in a message queue. In some embodiments, the message queue service 105 maintains a separate storage area (e.g., a dead letter queue) for storing event messages that were not successfully processed by the frontend 120. The message queue service 105 may be implemented as a component of the auxiliary services 106 or as a different component. In certain embodiments, the frontend 120 may periodically poll the message queue service 105 to identify and retrieve event messages for processing or re-processing. Event messages may be placed in the message queue for example by the message queue service 105, such as in response to when an event is detected for which the user has registered to trigger automatic generation of a request to execute user code. In some instances it may be desirable or more practical to detect such events, trigger generation of an event message, and provide the event message to the message queue service 105. For example, depending on the embodiment, the message queue service 105 may be configured to allow ordering of event messages so that the event messages are processed in a specific order and/or allow priority handling of event messages so that certain event messages may receive a higher priority than others. In another example, the message queue service 105 may be specifically or specially configured to facilitate transportation of certain types of programmatic events, such as database operations, certain types of data suitable for batch processing, and so on. In one embodiment the message queue service 105 may be configured to provide streaming, and/or ordered transport of messages (e.g., as a sharded set of data). The frontend 120 may then poll the message queue service 105 and retrieve event messages for further processing by the virtual compute system 110. Although the message queue service 105 is illustrated in FIG. 1 as a component external to the virtual compute system 110, in some cases, the message queue service 105 may be implemented as a component of the virtual compute system 110 (e.g., as part of the frontend 120 or another component that communicates with the frontend 120).

In another embodiment, instead of or in combination with using the message queue service 105, the frontend 120 may query the auxiliary services 106 directly to request and receive event messages for further processing, such as via invocation of an API provided by the auxiliary services 106. In another embodiment, the auxiliary services 106 may interface directly with the frontend 120 via one or more APIs and function calls. For example, when an event is detected and an event message is generated, the auxiliary services 106 may invoke an API provided by the frontend 120 to provide the event message directly to the frontend 120, without necessarily providing the event message to the message queue service 105.

Types of Events Processed and Generated by the Frontend

Events generated on the auxiliary services 106 or the virtual compute system 110 may provide a variety of information depending on their type. In some embodiments, such events may be categorized into 5 different types: (i) events about occurrences on the virtual compute system 110 or the auxiliary services 106, (ii) events about the event stream processed by the frontend 120, (iii) events about the events (e.g., aggregates or summaries of the events), (iv) meta-events indicating the various metric levels, and (v) events about user code (e.g., program codes or functions executed on the virtual compute system 110).

For example, the events under category (i) may include an indication that a customer has uploaded a file onto the storage service 108, an indication that the virtual machine instance 156 associated with a particular account owner has been terminated, or an indication that a database associated with the account owner has been modified.

Events under category (ii) may include an indication that the frontend 120 has not received any event for the past 5 minutes, or an indication that the event stream (e.g., a stream of code execution requests) is still working properly. For example, such an indication may be provided to the account owner associated with the event stream, so that the account owner can assess whether the period of inactivity is unusual and take any necessary action.

Events under category (iii) may include an aggregate summary of the events processed by the frontend 120 such as an indication that the frontend 120 should have processed 5,000 events in the last half hour. Such an aggregate summary may further specify the expected number of events to be received from each event source (e.g., an indication that the frontend 120 should have processed 500 events from event source A, 3,000 events from event source B, and 1,500 events from event source C). Such indications may be provided to the users of the virtual compute system 110 along with the actual number of events processed by the frontend 120 so that the users can sanity check their implementations or detect unusual behaviors/bugs by comparing the actual and expected numbers of events.

Events under category (iv) may include various metrics related to performance and code execution on the virtual compute system 110. Such events may include an indication that a user is still running 50 virtual machine instances on the virtual compute system 110, or an indication that the user has 80 TB of data stored in the storage service 108. For example, such an indication may be used to trigger the execution of a program code configured to send an email to an account owner (or the developer who actually wrote the code) informing the account owner of the higher-than-average resource usage. In some embodiments, such a level indication may be used to trigger the execution of a program code configured to adjust the resource levels to accommodate the increase or decrease in usage. For example, the frontend 120, upon detecting such an event, may be configured to execute a control function to increase the resource levels associated with the program code of the account owner, to throttle executions of the program code to operate under the specified resource levels associated with the program code, or to send a message to the account owner requesting the account owner's input on how to proceed in view of the higher-than-average usage or the account owner's approval for increasing the amount of resources allocated for executing the program code.

Events under category (v) may include specific information about code execution on the virtual compute system 110. For example, such information may include an indication that, for the last thousand times that an event was received from event source A, the program code failed to execute properly or timed out. Such an indication may be used to allow users to disable the program code or to modify the program code to better handle the events received from the particular event source identified as being problematic. For example, if the event indicates that the program code has been timing out on each invocation of the program code, the frontend 120, upon detecting such an event, may be configured to execute a control function to increase the duration specified for the user function, or send a message to the account owner requesting the account owner's input on how to proceed in view of the detected trend (e.g., repeatedly timing out) in the execution of the program code. In another example, when the frontend 120 determines that a particular user function has a 1 GB of memory allocated but in the 500 most recent executions of the program code, no more than 128 MB was used for each execution, the frontend 120 may execute a control function to adjust the amount of memory allocated to the particular program code, and send a message to the account owner, indicating that the amount of memory allocated to the particular program code has been adjusted in view of the trend in the execution of the particular program code. In yet another example, the frontend 120 may detect (e.g., based on an error that occurred while attempting to access certain resources of the account owner) that the permission settings for a particular user function are not properly configured, and cause a message to be sent to the account owner (or automatically adjust the permission settings for the particular user function such that the permission settings are properly configured).

Automatic Action in Response to Events

As described above, the virtual compute system 110 may perform a variety of actions in response to the events detected by and/or received from the auxiliary services 106 or one or more components of the virtual compute system 110. For example, the frontend 120 may detect that the account owner has used 75% of the allotted resources (e.g., number of requests, code execution duration, memory, etc.) and cause a message to be sent to the account owner, letting the account owner know that 75% of the allotted resources has been used. In another example, the frontend 120, upon detecting such an event, may cause a control function to be executed to adjust the rate at which the account owner uses the allotted resources. For example, the frontend 120 may cause a portion of the code execution requests received for the account owner to be purposefully throttled, rejected, delayed, directed to a separate storage area for later execution, etc. In another example, the frontend 120 may adjust the amount of resources allocated to each code execution request so that each execution utilizes a reduced amount of resources. If the account owner has specified that 120 MB of memory is to be allocated for each execution of the user code, but the frontend 120 determines that each execution of the user code has been using only 50 MB of memory, once the resource usage reaches a threshold level (e.g., 75%), the frontend 120 may automatically adjust the amount of memory allocated for each execution from 120 MB to 50 MB. For example, the control function may be configured to receive an event message generated in response to the account owner's resource usage reaching the threshold level, and adjust the amount of memory (e.g., or any other resource) allocated for the user code associated with the account owner. Although memory is used here as an example resource that may be monitored and adjusted (automatically or with account owner's approval), the monitored metrics may also include other resource levels (e.g., number of requests, duration, CPU, memory, storage, network, or other resources), the number of concurrent executions, the number of virtual machine instances/containers, the error rates, or any other metrics.

In some embodiments, the frontend 120 may monitor multiple conditions in parallel, and generate an event as soon as any one of those multiple conditions is satisfied. For example, the account owner may wish to stop running any user functions before any overage fees are charged to his or her account. In such an example, the frontend 120 may monitor the resources utilized by the account owner's user functions (e.g., memory, CPU, storage, network, etc.) and any other relevant criteria (e.g., number of requests), and as soon as any of the resources or criteria reaches a threshold value, the frontend 120 may automatically cause a control function to be executed to prevent the account owner from incurring any additional expenses. In another example, the account owner may wish to automatically authorize the virtual compute system 110 to charge the account owner additional fees so that the account owner's user functions can continue to be executed on the virtual compute system 110 without any interruption. In yet another example, the account owner may specify a custom function to be executed on the virtual compute system 110 as soon as one of several conditions is satisfied.

In some embodiments, the virtual compute system 110 may generate an event indicating that a software upgrade, a library update, or a system change has occurred or is expected to occur on the virtual compute system 110. Such an event may be provided to the various user functions on the virtual compute system 110 and/or to the auxiliary services 106, and in response to receiving such an event, a user function may perform an automated test run to determine whether the user function is compatible with the change. Based on the result of the automated test run, the user function may update certain variables, or make other changes to itself or other related user functions. In other embodiments, in response to receiving such an event, a user function may cause the received information to be recorded (e.g., in the storage service 108).

In some embodiments, the frontend 120 may cause one or more control functions to be executed based on a control policy specified by the account owner. If the account owner is cost-sensitive, the account owner may specify a control policy that would minimize the costs associated with using the services provided by the virtual compute system 110. On the other hand, if the account owner values performance over cost, the account owner may specify a control policy that would optimize the code execution performance. In some embodiments, each control policy may be associated with one or more control functions, and the frontend 120 may generate and forward one or more events to such control functions based on the control policy specified by the account owner.

Third Party User Case

In some embodiments, the control function executed by the frontend 120 may depend on the nature of the end user (e.g., customers of the account owner). For example, the account owner may deal with free users and paying users, and both classes of users may utilize the services provided by the account owner. In such an example, the frontend 120 may differentiate how the code execution requests are processed, based on the type of user initiating the code execution request. For example, if the resource usage associated with the account owner is reaching the monthly limit, the frontend 120 may throttle the code execution requests originating from the free users but not the paying users. In such an example, some or all of the code execution requests initiated by the free users may be routed to a separate storage area (e.g., dead letter queue) to be re-processed at a later time. Although the distinction is made here between free users and paying users, the difference in how the code execution requests are processed may be based on any other qualities or characteristics of the third party users. In some embodiments, the virtual compute system 110 may allow the account owner to specify a control policy indicating how the code execution requests associated with his or her account should be treated.

Dynamically Adjusting Metrics Granularity

In some embodiments, the metrics monitored by the virtual compute system 110 may also be dynamically changed. For example, account owner may want to see the log data associated with his or her account only once a day under normal circumstances, but if there is something unusual happening with his or her account, the account owner may want to see more frequent updates (e.g., every minute). In such an example, the frontend 120, upon detecting an occurrence that satisfies certain threshold criteria, may adjust the frequency at which updates are provided to the particular account owner. In some embodiments, the virtual compute system 110 may allow the account owner to specify these threshold criteria. In other embodiments, the virtual compute system 110 may automatically determine these threshold criteria based on past performance associated with the account owner or the user functions associated with the account owner. Similar techniques may be applied to logging. For example, the frontend 120, upon detecting an increased error rate or a spike in the number of events received, may cause a control function to be executed, where the control function is configured to turn up the granularity of the logged metrics (e.g., frequency, breadth, level of detail, etc.). If only errors are logged under normal circumstances, both errors and warnings may be logged when a threshold level of irregularities has been detected.

Dead Letter Queue

In some embodiments, the frontend 120 may receive an event message or a request to execute a program code, and if the frontend 120 is not able to successfully process the event message or the request (e.g., if the program code fails to execute or if there is something wrong with the request), the frontend 120 may send the request to a separate storage area called dead letter queue (DLQ). The requests placed in the DLQ may be re-processed at a later time. The items placed in the DLQ may be inspected by a human operator and/or recorded in a logging system (e.g., logging system 107). In some embodiments, the virtual compute system 110 may send an item placed in the DLQ to a control function configured to handle such requests. In some embodiments, the items placed in the DLQ are processed in the order that the items were placed in the DLQ. In other embodiments, the items placed in the DLQ are processed based on a priority value associated with the respective items. The priority values may be assigned to the items when the items are placed in the DLQ. The priority values assigned to the items in the DLQ may be modified over time (e.g., by the frontend 120 or another component managing the DLQ). In one embodiment, the DLQ is internally managed by the virtual compute system 110. In another embodiment, the DLQ is managed by the message queue service 105. In yet another embodiment, the DLQ is managed by individual account owners. In such an embodiment, the account owners may review the content stored in the DLQ and may decide to send some of the requests stored in the DLQ back to the virtual compute system 110 for re-processing.

Actions Performed on Items in DLQ

When an item (e.g., an event message, a code execution request, etc.) is placed in the DLQ, a variety of actions may be performed on the item depending on the implementation. In one example, the frontend 120 may determine which code version is associated with the code execution request that was placed in the DLQ. In such an example, if the frontend 120 determines that the code version is outdated, the frontend 120 may execute a control function configured to perform an automated update (e.g., to the latest stable version) of the code version of the one or more user functions associated with the code execution request.

In some embodiments, when a code execution request is placed in the DLQ, the frontend 120 may subsequently re-process the request or cause another function or another service to be performed. For example, the frontend 120 may provide an indication that the program code has failed to execute properly to a control function configured to generate logs, and the control function may forward the information to the logging service 107 to be recorded in a log associated with the account owner or to the storage service 108 to be stored in permanent storage associated with the account owner. In such an example, the account owner can later examine the item in the log or storage and determine what went wrong with the program code.

In another embodiment, the frontend 120 may perform analytics on the items that are getting rejected and being sent to the DLQ. By doing so, the frontend 120 may detect patterns in the items that are getting rejected and identify why such items are getting rejected. For example, if the frontend 120 determines that 90% of the rejected code execution requests are associated with a version of the code that was recently updated, and that the code execution requests associated with older versions of the code are only getting rejected 5% of the time, the frontend 120 may identify the code version as the reason that the rejected items are getting rejected. In response to identifying the reason, the frontend 120 may execute a control function configured to initiate an automatic rollback of the code version of the program code. In another case, in response to identifying the reason, the frontend 120 may send a notification to the account holder via a messenger service. In another example, the frontend 120 may perform a pattern matching on the data that are getting rejected and placed in the DLQ. The pattern matching may identify similarities that are shared by the items that are getting rejected. For example, the items may be associated with similar user functions, similar file sizes, similar origin addresses, etc. Based on the identified similarities, the frontend 120 may generate a report that is sent to the account owner or stored in the account owner's storage for later review.

In some embodiments, the frontend 120, after identifying one or more potential problems with the items that are being sent to the DLQ, may make any necessary adjustments and try processing the items again. For example, in response to determining that the code version associated with the code execution request caused the code execution request to fail, the frontend 120 may reconfigure the code execution request such that the reconfigured code execution request is associated with an older, stable version of the code, and process the reconfigured code execution through the virtual compute system 110. In another example, the account owner may utilize an image resizing function to generate thumbnails of the image files that uploaded by the account owner's customers. In such an example, if the frontend 120 determines that all of the code execution requests associated with image file sizes that are larger than 1 GB are getting rejected, the frontend 120 may execute a user function (e.g., specified by the account owner) configure to send a message to those customers, indicating that their requests may be getting rejected due to the large file size and that they should try uploading images having a smaller file size. In another example, if the frontend 120 determines that the code execution requests placed in the DLQ failed because the code execution requests are associated with incorrect permission settings (e.g., thereby causing errors when the code tries to access a particular database during execution), the frontend 120 may reconfigure (e.g., by specifying a different set of permission settings) the code execution requests and/or the program code associated with the code execution requests, and process the reconfigured code execution requests through the virtual compute system 110.

Criteria for Sending an Item to DLQ

In some cases, the criteria applied for sending an item to the DLQ may differ based on the type of item and/or the type of error generated by the item. For example, code execution requests associated with program codes owned and managed by the virtual compute system 110 may be placed in the DLQ after a different number of tries than code execution requests associated with program codes developed by the account owners. In another example, for one class of account owners, code execution requests may be sent to the DLQ only if the code fails to execute, and for another class of account owners, code execution requests may be sent to the DLQ if any warning is generated, even if the code itself executes successfully. In some embodiments, the frontend 120 causes code execution requests associated with program codes owned by the virtual compute system 110 to be sent to the DLQ for subsequent analysis by a human operator. In such embodiments, the frontend 120, upon detecting an error with a particular code execution request, may further determine whether the particular code execution request is associated with a program code that belongs to an account owner or to the virtual compute system 110. In response to determining that the particular code execution request belongs to the virtual compute system 110, the frontend 120 may send the code execution request to the DLQ to be analyzed by a human operator, without modifying the code execution request or the program code. On the other hand, in response to determining that the particular code execution requests belongs to an account owner, the frontend 120 may execute a control function configured to modify the code execution request or the program code itself, and cause the code execution request to be processed again through the virtual compute system 110.

In some embodiments, the virtual compute system 110 determines whether to send a request to the DLQ and whether to retrieve a request from the DLQ for re-processing (or whether to perform any other actions such as logging, discarding, etc.). In other embodiments, the virtual compute system 110 determines whether to send a request to the DLQ, and another system (e.g., the message queue service 105 or another user-controlled system) determines whether to send a request stored in the DLQ back to the virtual compute system 110 for re-processing (or whether to perform any other actions such as logging, discarding, etc.).

Other Data Associated with Code Execution Requests

A user request to execute a program code on the virtual compute system 110 may specify one or more third-party libraries (including native libraries) to be used along with the user code. In one embodiment, the user request includes a package file (e.g., a compressed file, a ZIP file, a RAR file, etc.) containing the user code and any libraries (and/or identifications of storage locations thereof). In some embodiments, the user request includes metadata that indicates the program code to be executed, the language in which the program code is written, the user associated with the request, and/or the computing resources (e.g., memory, etc.) to be reserved for executing the program code. For example, the program code may be provided with the request, previously uploaded by the user, provided by the virtual compute system 110 (e.g., standard routines), and/or provided by third parties. In some embodiments, such resource-level constraints (e.g., how much memory is to be allocated for executing a particular user code) are specified for the particular user code, and may not vary over each execution of the user code. In such cases, the virtual compute system 110 may have access to such resource-level constraints before each individual request is received, and the individual requests may not specify such resource-level constraints. In some embodiments, the user request may specify other constraints such as permission data that indicates what kind of permissions that the request has to execute the user code. Such permission data may be used by the virtual compute system 110 to invoke the user code, pull events from one of the event sources (e.g., auxiliary services 106), access private resources (e.g., on a private network), etc. The permission data may allow the user code to access other resources (e.g., read objects stored in the storage service 108, write logs to the logging service 107, modify data stored in a database service, etc.)

In some embodiments, the user request may specify the behavior that should be adopted for handling the user request. In such embodiments, the user request may include an indicator for enabling one or more execution modes in which the user code associated with the user request is to be executed. For example, the request may include a flag or a header for indicating whether the user code should be executed in a debug mode in which the debugging and/or logging output that may be generated in connection with the execution of the user code is provided back to the user (e.g., via a console user interface). In such an example, the virtual compute system 110 may inspect the request and look for the flag or the header, and if it is present, the virtual compute system 110 may modify the behavior (e.g., logging facilities) of the container in which the user code is executed, and cause the output data to be provided back to the user. In some embodiments, the behavior/mode indicators are added to the request by the user interface provided to the user by the virtual compute system 110. Other features such as source code profiling, remote debugging, etc. may also be enabled or disabled based on the indication provided in the request.

In some embodiments, the virtual compute system 110 may include multiple frontends 120. In such embodiments, a load balancer may be provided to distribute the incoming requests and/or event messages to the multiple frontends 120, for example, in a round-robin fashion. An example architecture of the frontend 120 is described in greater detail below with reference to FIG. 2.

Warming Pool Manager

The warming pool manager 130 ensures that virtual machine instances are ready to be used by the worker manager 140 when the virtual compute system 110 receives a request to execute user code on the virtual compute system 110. In the example illustrated in FIG. 1, the warming pool manager 130 manages the warming pool 130A, which is a group (sometimes referred to as a pool) of pre-initialized and pre-configured virtual machine instances that may be used to service incoming user code execution requests. In some embodiments, the warming pool manager 130 causes virtual machine instances to be booted up on one or more physical computing machines within the virtual compute system 110 and added to the warming pool 130A prior to receiving a code execution request that will be executed on the virtual machine instance. In other embodiments, the warming pool manager 130 communicates with an auxiliary virtual machine instance service (e.g., an instance provisioning service 109) to create and add new instances to the warming pool 130A. For example, the warming pool manager 130 may cause additional instances to be added to the warming pool 130A based on the available capacity in the warming pool 130A to service incoming requests. In some embodiments, the warming pool manager 130 may utilize both physical computing devices within the virtual compute system 110 and one or more virtual machine instance services to acquire and maintain compute capacity that can be used to service code execution requests received by the frontend 120. In some embodiments, the virtual compute system 110 may comprise one or more logical knobs or switches for controlling (e.g., increasing or decreasing) the available capacity in the warming pool 130A. For example, a system administrator may use such a knob or switch to increase the capacity available (e.g., the number of pre-booted instances) in the warming pool 130A during peak hours. In some embodiments, virtual machine instances in the warming pool 130A can be configured based on a predetermined set of configurations independent from a specific user request to execute a user's code. The predetermined set of configurations can correspond to various types of virtual machine instances to execute user codes. The warming pool manager 130 can optimize types and numbers of virtual machine instances in the warming pool 130A based on one or more metrics related to current or previous user code executions.

As shown in FIG. 1, instances may have operating systems (OS) and/or language runtimes loaded thereon. For example, the warming pool 130A managed by the warming pool manager 130 comprises instances 152, 154. The instance 152 includes an OS 152A and a runtime 152B. The instance 154 includes an OS 154A. In some embodiments, the instances in the warming pool 130A may also include containers (which may further contain copies of operating systems, runtimes, user codes, etc.), which are described in greater detail below. Although the instance 152 is shown in FIG. 1 to include a single runtime, in other embodiments, the instances depicted in FIG. 1 may include two or more runtimes, each of which may be used for running a different user code. In some embodiments, the warming pool manager 130 may maintain a list of instances in the warming pool 130A. The list of instances may further specify the configuration (e.g., OS, runtime, container, etc.) of the instances.

In some embodiments, the virtual machine instances in the warming pool 130A may be used to serve any user's request. In one embodiment, all the virtual machine instances in the warming pool 130A are configured in the same or substantially similar manner. In another embodiment, the virtual machine instances in the warming pool 130A may be configured differently to suit the needs of different users. For example, the virtual machine instances may have different operating systems, different language runtimes, and/or different libraries loaded thereon. In yet another embodiment, the virtual machine instances in the warming pool 130A may be configured in the same or substantially similar manner (e.g., with the same OS, language runtimes, and/or libraries), but some of those instances may have different container configurations. For example, two instances may have runtimes for both Python and Ruby, but one instance may have a container configured to run Python code, and the other instance may have a container configured to run Ruby code. In some embodiments, multiple warming pools 130A, each having identically-configured virtual machine instances, are provided.

The warming pool manager 130 may pre-configure the virtual machine instances in the warming pool 130A, such that each virtual machine instance is configured to satisfy at least one of the operating conditions that may be requested or specified by the user request to execute program code on the virtual compute system 110. In one embodiment, the operating conditions may include program languages in which the potential user codes may be written. For example, such languages may include Java, JavaScript, Python, Ruby, and the like. In some embodiments, the set of languages that the user codes may be written in may be limited to a predetermined set (e.g., set of 4 languages, although in some embodiments sets of more or less than four languages are provided) in order to facilitate pre-initialization of the virtual machine instances that can satisfy requests to execute user codes. For example, when the user is configuring a request via a user interface provided by the virtual compute system 110, the user interface may prompt the user to specify one of the predetermined operating conditions for executing the user code. In another example, the service-level agreement (SLA) for utilizing the services provided by the virtual compute system 110 may specify a set of conditions (e.g., programming languages, computing resources, etc.) that user requests should satisfy, and the virtual compute system 110 may assume that the requests satisfy the set of conditions in handling the requests. In another example, operating conditions specified in the request may include: the amount of compute power to be used for processing the request; the type of the request (e.g., HTTP vs. a triggered event); the timeout for the request (e.g., threshold time after which the request may be terminated); security policies (e.g., may control which instances in the warming pool 130A are usable by which user); etc, Worker Manager The worker manager 140 manages the instances used for servicing incoming code execution requests. In the example illustrated in FIG. 1, the worker manager 140 manages the active pool 140A, which is a group (sometimes referred to as a pool) of virtual machine instances that are currently assigned to one or more users. Although the virtual machine instances are described here as being assigned to a particular user, in some embodiments, the instance's may be assigned to a group of users, such that the instance is tied to the group of users and any member of the group can utilize resources on the instance. For example, the users in the same group may belong to the same security group (e.g., based on their security credentials) such that executing one member's code in a container on a particular instance after another member's code has been executed in another container on the same instance does not pose security risks. Similarly, the worker manager 140 may assign the instances and the containers according to one or more policies that dictate which requests can be executed in which containers and which instances can be assigned to which users. An example policy may specify that instances are assigned to collections of users who share the same account (e.g., account for accessing the services provided by the virtual compute system 110). In some embodiments, the requests associated with the same user group may share the same containers (e.g., if the user codes associated therewith are identical). In some embodiments, a request does not differentiate between the different users of the group and simply indicates the group to which the users associated with the requests belong.

As shown in FIG. 1, instances may have operating systems (OS), language runtimes, and containers. The containers may have individual copies of the OS and the runtimes and user codes loaded thereon. In the example of FIG. 1, the active pool 140A managed by the worker manager 140 includes the instances 156, 158. The instance 156 has an OS 156A, runtimes 156B, 156C, and containers 156D, 156E. The container 156D includes a copy of the OS 156A, a copy of the runtime 156B, and a copy of a code 156D-1. The container 156E includes a copy of the OS 156A, a copy of the runtime 156C, and a copy of a code 156E-1. The instance 158 has an OS 158A, runtimes 158B, 158C, 158E, 158F, a container 158D, and codes 158G, 158H. The container 158D has a copy of the OS 158A, a copy of the runtime 158B, and a copy of a code 158D-1. As illustrated in FIG. 1, instances may have user codes loaded thereon, and containers within those instances may also have user codes loaded therein. In some embodiments, the worker manager 140 may maintain a list of instances in the active pool 140A. The list of instances may further specify the configuration (e.g., OS, runtime, container, etc.) of the instances. In some embodiments, the worker manager 140 may have access to a list of instances in the warming pool 130A (e.g., including the number and type of instances). In other embodiments, the worker manager 140 requests compute capacity from the warming pool manager 130 without having knowledge of the virtual machine instances in the warming pool 130A.

In the example illustrated in FIG. 1, user codes are executed in isolated compute systems referred to as containers (e.g., containers 156D, 156E, 158D). Containers are logical units created within a virtual machine instance using the resources available on that instance. For example, the worker manager 140 may, based on information specified in the request to execute user code, create a new container or locate an existing container in one of the instances in the active pool 140A and assigns the container to the request to handle the execution of the user code associated with the request. In one embodiment, such containers are implemented as Linux containers. The virtual machine instances in the active pool 140A may have one or more containers created thereon and have one or more program codes associated with the user loaded thereon (e.g., either in one of the containers or in a local cache of the instance). Each container may have credential information made available therein, so that user codes executing on the container have access to whatever the corresponding credential information allows them to access.

Once a request has been successfully processed by the frontend 120, the worker manager 140 finds capacity to service the request to execute user code on the virtual compute system 110. For example, if there exists a particular virtual machine instance in the active pool 140A that has a container with the same user code loaded therein (e.g., code 156D-1 shown in the container 156D), the worker manager 140 may assign the container to the request and cause the user code to be executed in the container. Alternatively, if the user code is available in the local cache of one of the virtual machine instances (e.g., codes 158G, 158H, which are stored on the instance 158 but do not belong to any individual containers), the worker manager 140 may create a new container on such an instance, assign the container to the request, and cause the user code to be loaded and executed in the container.

If the worker manager 140 determines that the user code associated with the request is not found on any of the instances (e.g., either in a container or the local cache of an instance) in the active pool 140A, the worker manager 140 may determine whether any of the instances in the active pool 140A is currently assigned to the user associated with the request and has compute capacity to handle the current request. If there is such an instance, the worker manager 140 may create a new container on the instance and assign the container to the request. Alternatively, the worker manager 140 may further configure an existing container on the instance assigned to the user, and assign the container to the request. For example, the worker manager 140 may determine that the existing container may be used to execute the user code if a particular library demanded by the current user request is loaded thereon. In such a case, the worker manager 140 may load the particular library and the user code onto the container and use the container to execute the user code.

If the active pool 140A does not contain any instances currently assigned to the user, the worker manager 140 pulls a new virtual machine instance from the warming pool 130A, assigns the instance to the user associated with the request, creates a new container on the instance, assigns the container to the request, and causes the user code to be downloaded and executed on the container.

The user code may be downloaded from an auxiliary service 106 such as the storage service 108 of FIG. 1. Data 108A illustrated in FIG. 1 may comprise user codes uploaded by one or more users, metadata associated with such user codes, or any other data utilized by the virtual compute system 110 to perform one or more techniques described herein. Although only the storage service 108 is illustrated in the example of FIG. 1, the virtual environment 100 may include other levels of storage systems from which the user code may be downloaded. For example, each instance may have one or more storage systems either physically (e.g., a local storage resident on the physical computing system on which the instance is running) or logically (e.g., a network-attached storage system in network communication with the instance and provided within or outside of the virtual compute system 110) associated with the instance on which the container is created. Alternatively, the code may be downloaded from a web-based data store provided by the storage service 108.

Once the worker manager 140 locates one of the virtual machine instances in the warming pool 130A that can be used to serve the user code execution request, the warming pool manager 130 or the worker manger 140 takes the instance out of the warming pool 130A and assigns it to the user associated with the request. The assigned virtual machine instance is taken out of the warming pool 130A and placed in the active pool 140A. In some embodiments, once the virtual machine instance has been assigned to a particular user, the same virtual machine instance cannot be used to service requests of any other user. This provides security benefits to users by preventing possible co-mingling of user resources. Alternatively, in some embodiments, multiple containers belonging to different users (or assigned to requests associated with different users) may co-exist on a single virtual machine instance. Such an approach may improve utilization of the available compute capacity.

In some embodiments, the virtual compute system 110 may maintain a separate cache in which user codes are stored to serve as an intermediate level of caching system between the local cache of the virtual machine instances and a web-based network storage (e.g., accessible via the network 104). The various scenarios that the worker manager 140 may encounter in servicing the request are described in greater detail below with reference to FIG. 4.

After the user code has been executed, the worker manager 140 may tear down the container used to execute the user code to free up the resources it occupied to be used for other containers in the instance. Alternatively, the worker manager 140 may keep the container running to use it to service additional requests from the same user. For example, if another request associated with the same user code that has already been loaded in the container, the request can be assigned to the same container, thereby eliminating the delay associated with creating a new container and loading the user code in the container. In some embodiments, the worker manager 140 may tear down the instance in which the container used to execute the user code was created. Alternatively, the worker manager 140 may keep the instance running to use it to service additional requests from the same user. The determination of whether to keep the container and/or the instance running after the user code is done executing may be based on a threshold time, the type of the user, average request volume of the user, and/or other operating conditions. For example, after a threshold time has passed (e.g., 5 minutes, 30 minutes, 1 hour, 24 hours, 30 days, etc.) without any activity (e.g., running of the code), the container and/or the virtual machine instance is shutdown (e.g., deleted, terminated, etc.), and resources allocated thereto are released. In some embodiments, the threshold time passed before a container is torn down is shorter than the threshold time passed before an instance is torn down.

Other Services

In some embodiments, the virtual compute system 110 may provide data to one or more of the auxiliary services 106 as it services incoming code execution requests. For example, the virtual compute system 110 may communicate with the monitoring/logging/billing services 107. The monitoring/logging/billing services 107 may include: a monitoring service for managing monitoring information received from the virtual compute system 110, such as statuses of containers and instances on the virtual compute system 110; a logging service for managing logging information received from the virtual compute system 110, such as activities performed by containers and instances on the virtual compute system 110; and a billing service for generating billing information associated with executing user code on the virtual compute system 110 (e.g., based on the monitoring information and/or the logging information managed by the monitoring service and the logging service). In addition to the system-level activities that may be performed by the monitoring/logging/billing services 107 (e.g., on behalf of the virtual compute system 110) as described above, the monitoring/logging/billing services 107 may provide application-level services on behalf of the user code executed on the virtual compute system 110. For example, the monitoring/logging/billing services 107 may monitor and/or log various inputs, outputs, or other data and parameters on behalf of the user code being executed on the virtual compute system 110. Although shown as a single block, the monitoring, logging, and billing services 107 may be provided as separate services.

In some embodiments, the worker manager 140 may perform health checks on the instances and containers managed by the worker manager 140 (e.g., those in the active pool 140A). For example, the health checks performed by the worker manager 140 may include determining whether the instances and the containers managed by the worker manager 140 have any issues of (1) misconfigured networking and/or startup configuration, (2) exhausted memory, (3) corrupted file system, (4) incompatible kernel, and/or any other problems that may impair the performance of the instances and the containers. In one embodiment, the worker manager 140 performs the health checks periodically (e.g., every 5 minutes, every 30 minutes, every hour, every 24 hours, etc.). In some embodiments, the frequency of the health checks may be adjusted automatically based on the result of the health checks. In other embodiments, the frequency of the health checks may be adjusted based on user requests. In some embodiments, the worker manager 140 may perform similar health checks on the instances and/or containers in the warming pool 130A. The instances and/or the containers in the warming pool 130A may be managed either together with those instances and containers in the active pool 140A or separately. In some embodiments, in the case where the health of the instances and/or the containers in the warming pool 130A is managed separately from the active pool 140A, the warming pool manager 130, instead of the worker manager 140, may perform the health checks described above on the instances and/or the containers in the warming pool 130A.

In some embodiments, the virtual compute system 110 is adapted to begin execution of the user code shortly after it is received (e.g., by the frontend 120). A time period can be determined as the difference in time between initiating execution of the user code (e.g., in a container on a virtual machine instance associated with the user) and receiving a request to execute the user code (e.g., received by a frontend). Another time period can be determined as the difference in time between (1) detection of an event on an event-triggering service and (2a) receiving a request to execute the user code (e.g., received by a frontend) and/or (2b) initiating execution of the user code (e.g., in a container on a virtual machine instance associated with the user). Another time period can be determined as the difference in time between (1) retrieving, accessing, or receiving an event message (e.g., directly or indirectly from on an event-triggering service) and (2) initiating processing of a request to execute the user code (e.g., in a container on a virtual machine instance associated with the user). The virtual compute system 110 is adapted to begin execution of the user code within a time period that is less than a predetermined duration. In one embodiment, the predetermined duration is 500 ms. In another embodiment, the predetermined duration is 300 ms. In another embodiment, the predetermined duration is 100 ms. In another embodiment, the predetermined duration is 50 ms. In another embodiment, the predetermined duration is 10 ms. In another embodiment, the predetermined duration may be any value chosen from the range of 10 ms to 500 ms. In some embodiments, the virtual compute system 110 is adapted to begin execution of the user code within a time period that is less than a predetermined duration if one or more conditions are satisfied. For example, the one or more conditions may include any one of: (1) the user code is loaded on a container in the active pool 140A at the time the request is received; (2) the user code is stored in the code cache of an instance in the active pool 140A at the time the request is received; (3) the active pool 140A contains an instance assigned to the user associated with the request at the time the request is received; or (4) the warming pool 130A has capacity to handle the request at the time the request is received.

The worker manager 140 may include an instance allocation unit for finding compute capacity (e.g., containers) to service incoming code execution requests and a user code execution module for facilitating the execution of user codes on those containers.

General Architecture of the Frontend

Figure 2:
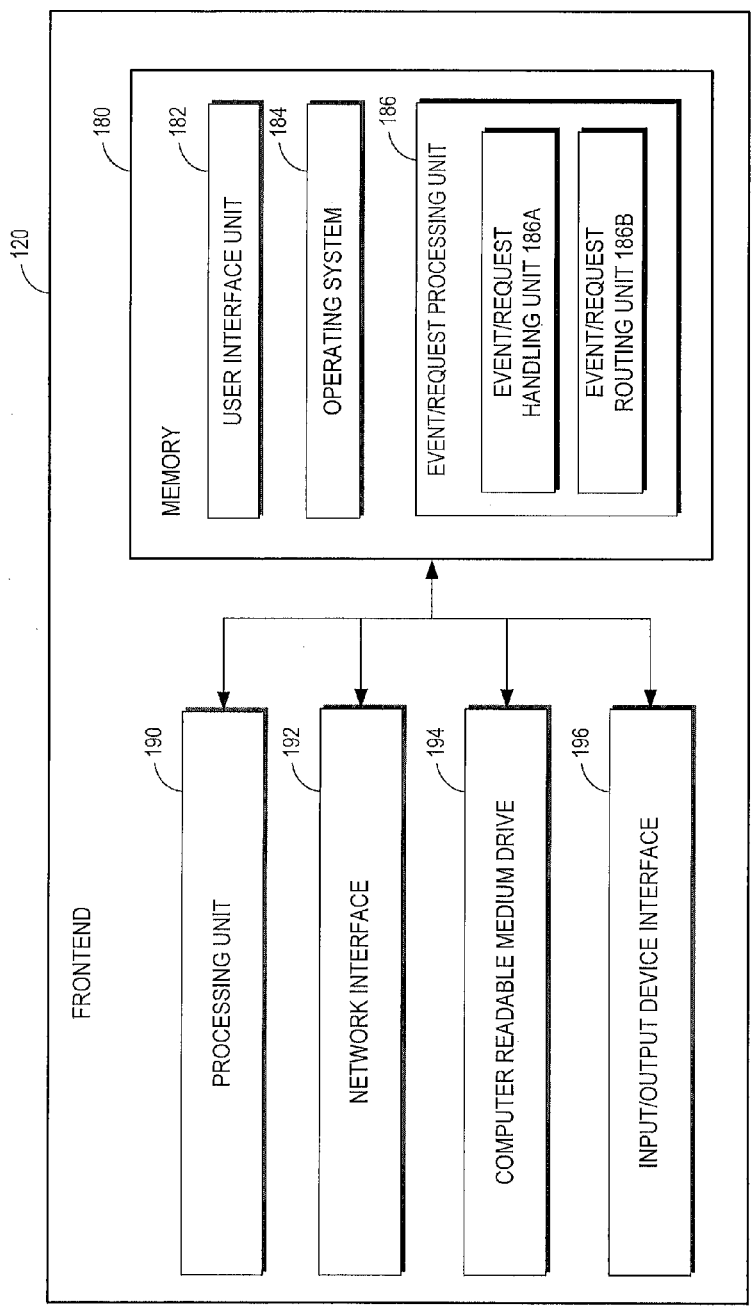
FIG. 2 depicts a general architecture of a computing device providing a frontend of a virtual compute system for processing event messages for user requests to execute program codes.

FIG. 2 depicts a general architecture of a computing system (referenced as frontend 120) that processes (e.g., receives, generates, and/or routes) event messages for user requests to execute program codes in the virtual compute system 110. The general architecture, of the frontend 120 depicted in FIG. 2 includes an arrangement of computer hardware and software modules that may be used to implement aspects of the present disclosure. The hardware modules may be implemented with physical electronic devices, as discussed in greater detail below. The frontend 120 may include many more (or fewer) elements than those shown in FIG. 2. It is not necessary, however, that all of these generally conventional elements be shown in order to provide an enabling disclosure. Additionally, the general architecture illustrated in FIG. 2 may be used to implement one or more of the other components illustrated in FIG. 1. As illustrated, the frontend 120 includes a processing unit 190, a network interface 192, a computer readable medium drive 194, an input/output device interface 196, all of which may communicate with one another by way of a communication bus. The network interface 192 may provide connectivity to one or more networks or computing systems. The processing unit 190 may thus receive information and instructions from other computing systems or services via the network 104. The processing unit 190 may also communicate to and from memory 180 and further provide output information for an optional display (not shown) via the input/output device interface 196. The input/output device interface 196 may also accept input from an optional input device (not shown).

The memory 180 may contain computer program instructions (grouped as modules in some embodiments) that the processing unit 190 executes in order to implement one or more aspects of the present disclosure. The memory 180 generally includes RAM, ROM and/or other persistent, auxiliary or non-transitory computer-readable media. The memory 180 may store an operating system 184 that provides computer program instructions for use by the processing unit 190 in the general administration and operation of the worker manager 140. The memory 180 may further include computer program instructions and other information for implementing aspects of the present disclosure. For example, in one embodiment, the memory 180 includes a user interface unit 182 that generates user interfaces (and/or instructions therefor) for display upon a computing device, e.g., via a navigation and/or browsing interface such as a browser or application installed on the computing device. In addition, the memory 180 may include and/or communicate with one or more data repositories (not shown), for example, to access user program codes and/or libraries.

In addition to and/or in combination with the user interface unit 182, the memory 180 may include an event/request processing unit 186 which may include an event/request handling unit 186A and an event/request routing unit 186B that may be executed by the processing unit 190. In one embodiment, the user interface unit 182, the event/request handling unit 186A, and the event/request routing unit 186B individually or collectively implement various aspects of the present disclosure, e.g., processing a code execution request (or an event message for a request to executed a program code), detecting a trend in the processing of the code execution request, generating a request to execute another program code based on the detected trend, etc. as described herein.

The event/request handling unit 186A may determine that one or more code execution requests have produced unexpected results and select one or more actions to be performed in response to such unexpected results. For example, the event/request handling unit 186A may determine that the amount of available resources associated with a program code has fallen below a threshold level, and determine that a control function that is configured to allocate additional resources for use by the program code should be executed. The event/request routing unit 186B may perform the actions determined by the event/request handling unit 186A. For example, the event/request routing unit 186B may route, for example, code execution requests that were not processed successfully to the dynamic DLQ. In another example, the event/request routing unit 186B may cause a notification to be sent to a user, or a control function configured to either modify the program code or adjust certain parameters or configuration data associated with the program code to be executed.

While the event/request handling unit 186A and the event/request routing unit 186B are shown in FIG. 2 as part of the frontend 120, in other embodiments, all or a portion of the event/request handling unit 186A and the event/request routing unit 186B may be implemented by other components of the virtual compute system 110 and/or another computing device. For example, in certain embodiments of the present disclosure, another computing device in communication with the virtual compute system 110 may include several modules or components that operate similarly to the modules and components illustrated as part of the frontend 120. In some embodiments, the frontend 120 may further include components other than those illustrated in FIG. 2.

Example Routine for Processing Code Execution Requests

Figure 3:
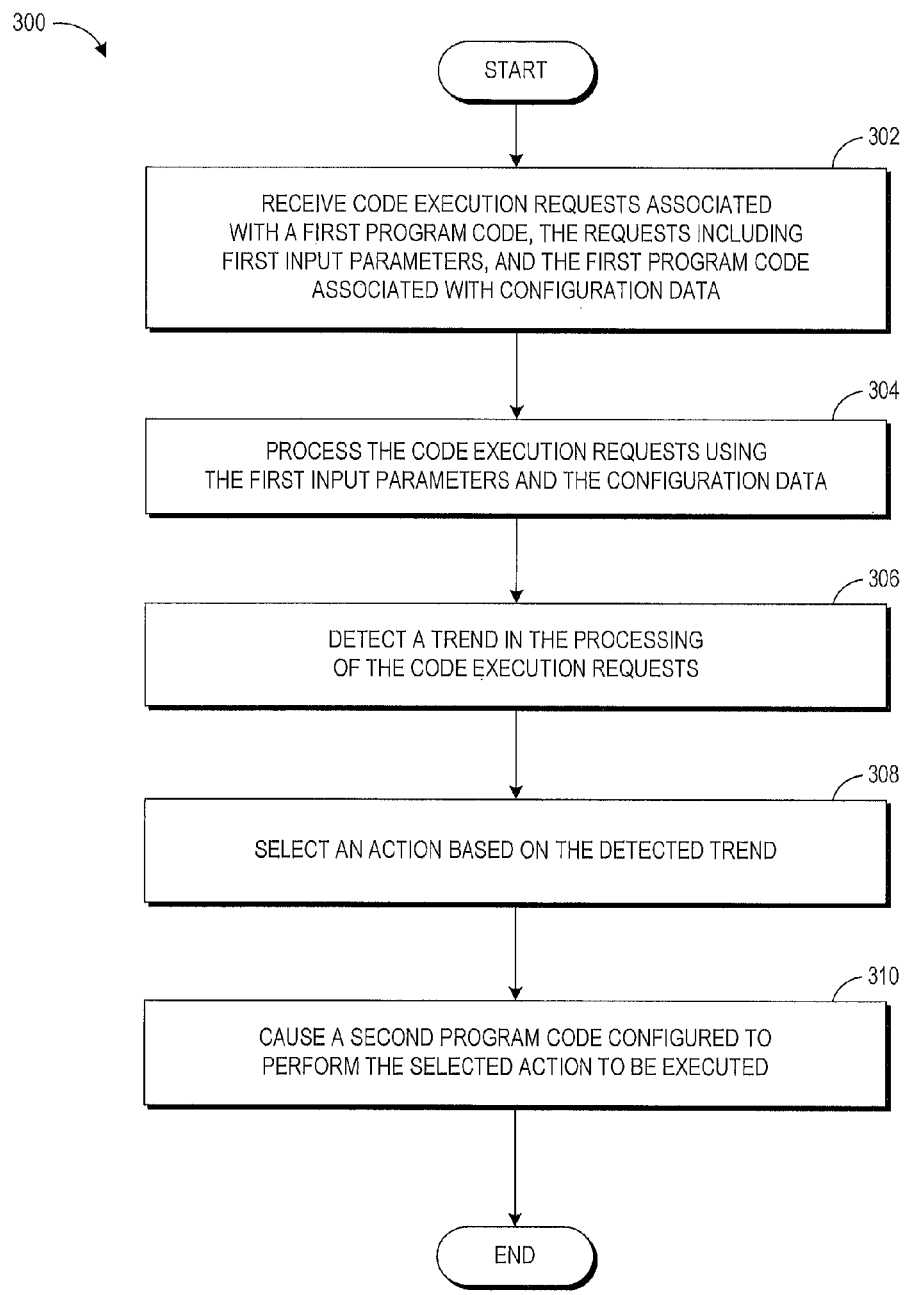
FIG. 3 is a flow diagram illustrating a request processing routine implemented by a frontend of a virtual compute system, according to an example aspect.

Turning now to FIG. 3, a routine 300 implemented by one or more components of the virtual compute system 110 (e.g., the frontend 120) will be described. Although routine 300 is described with regard to implementation by the frontend 120, one skilled in the relevant art will appreciate that alternative components may implement routine 300 or that one or more of the blocks may be implemented by a different component or in a distributed manner.

At block 302 of the illustrative routine 300, the frontend 120 receives a plurality of code execution requests associated with a first program code. The code execution requests may arrive at the frontend 120 in the form of event messages that are associated with (or configured to be received by) the first program code. For example, such event messages may include an identity of the first program code. The event messages and/or the code execution requests may include one or more first input parameters to be used for executing the first program code. In addition, the first program code may be associated with a set of configuration data that is specified for the first program code by, for example, the account owner associated with the first program code. The configuration data may include the resources allocated for executing the first program code. The resources may comprise one or more of CPU, memory, network, input/output (I/O), a maximum number of requests, or a maximum execution duration, or any other computing resources or constraints associated with the first program code.

Next, at block 304, the frontend 120 processes the plurality of code execution requests using the one or more first input parameters and the configuration data. For example, the frontend 120 may cause the first program code to be executed for each of the plurality of code execution requests, by using the first input parameters and the configuration data. In another example, the frontend 120 causes the first program code to be executed for only a subset of the plurality of code execution requests, and determines that other code execution requests have failed due to, for example, an error in the provided input parameters or an insufficient amount of resources allocated to the first program code.

At block 306, the frontend 120 detects a trend in the processing of the plurality of code execution requests. For example, the detected trend may be that code execution requests received at a certain time of day are more likely to fail. In another example, the detected trend may be that 95% of the code execution requests associated with the latest version of the first program code have failed so far. In some embodiments, detecting a trend comprises determining whether the attempted code execution has produced an unexpected result (e.g., failure, error, warning, etc.) or satisfied any triggering conditions (e.g., failed three times in a row, etc.).

At block 308, the frontend 120 selects an action based on the detected trend. For example, the selected action may be one of creating a log detailing the trend or unexpected result, automatically modifying the first program code or parameters associated with the first program code, sending a warning message or notification to the account owner, sending the request to a separate storage area for additional processing, executing a control function to make adjustments (e.g., perform an update, a rollback, etc.) to place the first program code in a better state for execution, etc. For example, if the frontend 120 determined at block 306 that most of the code execution requests associated with the latest version of the first program code have been failing, in response, the frontend 120 may determine that the latest version of the first program code may not be stable and that a rollback may need to be performed.

At block 310, the frontend 120 causes a second program code configured to perform the selected action to be executed. The frontend 120 may determine one or more second input parameters that are used for executing the second program code. As discuss above, the second program code may be configured to perform any one of creating a log detailing the trend or unexpected result, automatically modifying the first program code or parameters associated with the first program code, sending a warning message or notification to the account owner, sending the request to a separate storage area for additional processing, executing a control function to make adjustments (e.g., perform an update, a rollback, etc.) to place the first program code in a better state for execution, etc. In some embodiments, the second program code may be configured to modify at least one of the first program code or the configuration data associated with the first program code. For example, if the frontend 120 determined that the amount of memory allocated for executing the first program code is too low and is causing the code execution requests associated with the first program code to fail, the frontend 120 may cause the second program code to be executed, where the second program code is configured to increase the amount of memory allocated for executing the first program code. In another example, the second program code may be configured to send the request, after the request has failed to process successfully, to a separate storage area (e.g., a dynamic DLQ) configured to store requests for further analysis/processing. The requests that are sent to such a separate storage area may be sent back to the frontend 120 for re-processing, may generate notifications to the account owner, or may be discarded. A process for sending a request to a DLQ is described in greater detail below with reference to FIG. 4, While the routine 300 of FIG. 3 has been described above with reference to blocks 302-310, the embodiments described herein are not limited as such, and one or more blocks may be omitted, modified, or switched without departing from the spirit of the present disclosure. Further, the routine 300 of FIG. 3 may include different processes or routines which may be performed in a different order.

Example Routine for Sending Code Execution Requests to DLQ

Figure 4:
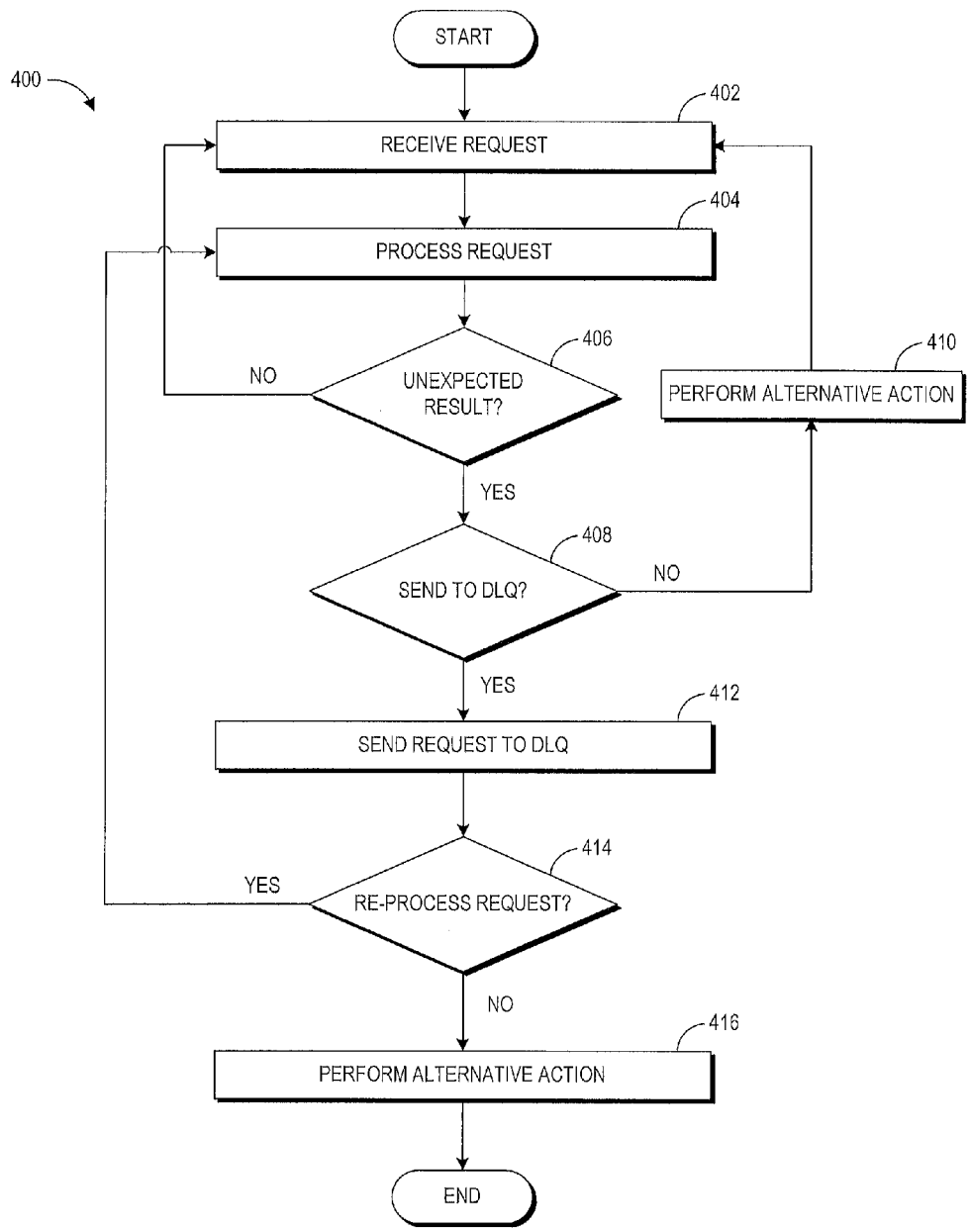
FIG. 4 is a flow diagram illustrating a request routing routine implemented by a frontend of a virtual compute system, according to an example aspect.

Turning now to FIG. 4, a routine 400 implemented by one or more components of the virtual compute system 110 (e.g., the frontend 120) will be described. Although routine 400 is described with regard to implementation by the frontend 120, one skilled in the relevant art will appreciate that alternative components may implement routine 400 or that one or more of the blocks may be implemented by a different component or in a distributed manner.

At block 402 of the illustrative routine 400, the frontend 120 receives a code execution request associated with a program code. The code execution requests may arrive at the frontend 120 in the form of an event message that is associated with (or configured to be received by) the program code. For example, such event messages may include an identity of the program code and one or more input parameters to the program code. The program code may be associated with a set of configuration data that is specified for the program code by, for example, the account owner associated with the program code. The configuration data may include the resources allocated for executing the program code. The resources may comprise one or more of CPU, memory, network, input/output (I/O), a maximum number of requests, or a maximum execution duration, or any other computing resources or constraints associated with the program code, Next, at block 404, the frontend 120 processes the code execution request using the one or more input parameters and the configuration data. For example, the frontend 120 may cause the program code to be executed (e.g., either successfully or unsuccessfully) using the input parameters and the configuration data associated with the program code.

At block 406, the frontend 120 determines whether the execution of the program code (or the attempted execution thereof) has produced an unexpected result. The unexpected result may be any one of an error, a warning, or any result other than a successful execution of the program code. If the frontend 120 determines that the execution of the program code has not produced an unexpected result, the routine proceeds to block 402 to receive and process additional requests. Otherwise, the routine 400 proceeds to block 408.

At block 408, the frontend 120 determines whether the request should be sent to a DLQ (or any other separate storage area that is either internal or external to the virtual compute system 110). If the frontend 120 determines that the request should not be sent to a DLQ, the routine 400 proceeds to block 410 to perform an alternative action. The alternative action may include, for example, any one of creating a log detailing the unexpected result, automatically modifying the program code or the configuration data associated with the program code, sending a warning message or notification to the account owner, executing a control function to make adjustments (e.g., perform an update, a rollback, etc.) to place the first program code in a better state for execution, discarding the request, etc. If the frontend 120 determines that the request should be sent to a DLQ, the routine 400 proceeds to block 412 to send the request to the DLQ.

At block 414, the frontend 120 determines whether a request stored in the DLQ should be re-processed. For example, the request considered for re-processing may be the request that was sent to the DLQ at block 412. In another example, the request considered for re-processing may be a different request that already existed in the DLQ with the request was sent to the DLQ at block 412. In some embodiments, the frontend 120 performs other actions or processes other jobs between blocks 412 and 414. For example, after a request is sent to the DLQ at block 412, the same request may be considered for re-processing at block 414 after a threshold amount of time (e.g., 5 minutes, 30 minutes, 2 hours, etc.) has passed. If the frontend 120 determines that the request stored in the DLQ should be re-processed, the routine 400 proceeds to block 404 to process the request. Otherwise, the frontend 120 performs an alternative action at block 416. For example, the alternative action may be any one of creating a log detailing the unexpected result, automatically modifying the program code or the configuration data associated with the program code, sending a warning message or notification to the account owner, executing a control function to make adjustments (e.g., perform an update, a rollback, etc.) to place the first program code in a better state for execution, discarding the request, etc. Although several actions that may be performed by the frontend 120 are described herein, the actions that may be performed by the frontend 120 in response to detecting an unexpected results are not limited to such examples, and may include other actions.

While the routine 400 of FIG. 4 has been described above with reference to blocks 402-416, the embodiments described herein are not limited as such, and one or more blocks may be omitted, modified, or switched without departing from the spirit of the present disclosure. Further, the routine 400 of FIG. 4 may include different processes or routines which may be performed in a different order.

Other Considerations

It will be appreciated by those skilled in the art and others that all of the functions described in this disclosure may be embodied in software executed by one or more physical processors of the disclosed components and mobile communication devices. The software may be persistently stored in any type of non-volatile storage.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable storage medium and loaded into memory of the computing device using a drive mechanism associated with a computer readable storing the computer executable components such as a CD-ROM, DVD-ROM, or network interface. Further, the component and/or data can be included in a single device or distributed in any manner. Accordingly, general purpose computing devices may be configured to implement the processes, algorithm, and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for processing event messages for requests to execute program code on one or more virtual machine instances, the system comprising:
a frontend computing system comprising one or more hardware computing devices executing specific computer-executable instructions, the frontend computing system in communication with (i) a virtual compute system adapted to provide compute capacity on a per-request basis and (ii) one or more other services, the frontend computing system configured to at least:
receive a plurality of code execution requests associated with a first program code, each code execution request including an identity of a user account, an identity of the first program code, and one or more first input parameters to the first program code, wherein the user account is associated with the first program code and a set of execution parameters used for executing program codes associated with the user account;

process the plurality of code execution requests at least by attempting to execute the first program code at a first time period using the one or more first input parameters and the set of execution parameters;

determine that one or more requests from the plurality of code execution requests were not processed successfully due to an error during execution of the first program code;

route the one or more requests to a separate storage area for additional processing, the separate storage area storing a plurality of requests that were not processed successfully by the frontend computing system;

determine whether a request stored in the separate storage area is to be processed again by the frontend computing system; and in response to determining that the request is to be processed again by the frontend computing system, process the request at least by attempting to execute the first program code at a second time period subsequent to the first time period.

2. The system of claim 1, wherein the set of execution parameters comprises one or more levels of computing resources allocated to the program codes associated with the user account, the computing resources comprising one or more of CPU, memory, network, input/output (I/O), a maximum number of requests, or a maximum execution duration.

3. The system of claim 1, wherein the separate storage area comprises a dynamic dead letter queue (DLQ) configured to store code execution requests.

4. The system of claim 1, wherein the one or more other services comprise one of a storage service, a monitoring service, a logging service, a billing service, a data stream service, a messenger service, a database service, or a message queueing service.

5. A system, comprising:
a virtual compute system comprising one or more hardware computing devices executing specific computer-executable instructions and configured to at least maintain a plurality of pre-initialized virtual machine instances configured to execute program codes thereon;
a dynamic dead letter queue (DLQ) configured to store code execution requests; and
a frontend computing system comprising one or more hardware computing devices executing specific computer-executable instructions and configured to at least:
receive a plurality of code execution requests associated with the first program code, each code execution request including one or more first input parameters to the first program code, the first program code associated with configuration data;
process the plurality of code execution requests using the one or more first input parameters and the configuration data;
detect a problem in executing a subset of the plurality of code execution requests associated with the first program code;
without successfully executing the first program code for the subset of plurality of code execution requests, route the subset of the plurality of code execution requests to the dynamic DLQ;
determine that a request in the subset of the plurality of code execution requests in the dynamic DLQ is to be re-processed;
re-process the request at least by executing the first program code using the one or more first input parameters;
detect a trend in the processing of the plurality of code execution requests;
determine one or more second input parameters to a second program code based on the detected trend; and
cause the second program code to be executed on one of the plurality of pre-initialized virtual machine instances that is pre-initialized for executing the second program code using the one or more second input parameters.

6. The system of claim 5, wherein the second program code modifies the first program code by updating one or more parameters associated with the first program code, the one or more parameters comprising at least one of version information, permission information, runtime information, or library information.

7. The system of claim 5, wherein the second program code modifies the configuration data associated with the first program code by adjusting one or more levels of computing resources allocated for executing the first program code, the computing resources comprising one or more of CPU, memory, network, input/output (I/O), a maximum number of requests, or a maximum execution duration.

8. The system of claim 5, wherein the frontend computing system is further configured to:
determine a control policy associated with the first program code;
determine whether the control policy indicates that permission from an account holder associated with the first program code is needed before modifying the first program code; and
receive a confirmation from the account holder that the first program code may be modified in view of the detected trend, prior to modifying the at least one of the first program code or the configuration data associated with the first program code.

9. The system of claim 5, wherein the plurality of code execution requests are generated by an external service in response to an occurrence of a triggering event associated with the first program code, the external service comprising one of a storage service, a monitoring service, a logging service, a billing service, a data stream service, a messenger service, a database service, or a message queueing service.

10. A computer-implemented method comprising:
as implemented by one or more computing devices configured with specific executable instructions,
receiving a plurality of code execution requests associated with a first program code, each code execution request including one or more first input parameters to the first program code, the first program code associated with configuration data;
processing the plurality of code execution requests using the one or more first input parameters and the configuration data;
detecting a problem in executing one of the plurality of code execution requests associated with the first program code;
without successfully executing the first program code for the code execution request, routing the code execution request to a dynamic dead letter queue (DLQ) configured to store code execution requests;

causing at least one of the first program code or the configuration data associated with the first program code to be modified;
determining that the code execution request in the dynamic DLQ is to be re-processed;
re-processing the code execution request using the modified at least one of the first program code or the configuration data;
detecting a trend in the processing of the plurality of code execution requests;
selecting an action based on the detected trend; and
causing a second program code configured to perform the selected action to be executed on a pre-initialized virtual computing instance.

11. The computer-implemented method of claim 10, wherein the second program code modifies the first program code by updating one or more parameters associated with the first program code, the one or more parameters comprising at least one of version information, permission information, runtime information, or library information.

12. The computer-implemented method of claim 10, wherein the second program code modifies the configuration data associated with the first program code by adjusting one or more levels of computing resources allocated for executing the first program code, the computing resources comprising one or more of CPU, memory, network, input/output (I/O), a maximum number of requests, or a maximum execution duration.

13. The computer-implemented method of claim 10, further comprising:
determining a control policy associated with the first program code;
determining whether the control policy indicates that permission from an account holder associated with the first program code is needed before modifying the first program code; and
receiving a confirmation from the account holder that the first program code may be modified in view of the detected trend, prior to modifying the at least one of the first program code or the configuration data associated with the first program code.

14. Non-transitory physical computer storage comprising instructions that, when executed by one or more computing devices, configure the one or more computing devices to:
receive a plurality of code execution requests associated with a first program code, each code execution request including one or more first input parameters to the first program code, the first program code associated with configuration data;
process the plurality of code execution requests using the one or more first input parameters and the configuration data;
detect a problem in executing one of the plurality of code execution requests associated with the first program code;
without successfully executing the first program code for the code execution request, route the code execution request to a dynamic dead letter queue (DLQ) configured to store code execution requests;
cause at least one of the first program code or the configuration data associated with the first program code to be modified;
determine that the code execution request in the dynamic DLQ is to be re-processed;
re-process the code execution request using the modified at least one of the first program code or the configuration data;
detect a trend in the processing of the plurality of code execution requests;
select an action based on the detected trend; and
cause a second program code configured to perform the selected action to be executed on a pre-initialized virtual computing instance.

15. The non-transitory physical computer storage of claim 14, wherein the second program code modifies the first program code by updating one or more parameters associated with the first program code, the one or more parameters comprising at least one of version information, permission information, runtime information, or library information.

16. The non-transitory physical computer storage of claim 14, wherein the second program code modifies the configuration data associated with the first program code by adjusting one or more levels of computing resources allocated for executing the first program code, the computing resources comprising one or more of CPU, memory, network, input/output (I/O), a maximum number of requests, or a maximum execution duration.

17. The non-transitory physical computer storage of claim 14, wherein the instructions further configure the one or more computing devices to:
determine a control policy associated with the first program code;
determine whether the control policy indicates that permission from an account holder associated with the first program code is needed before modifying the first program code; and
receive a confirmation from the account holder that the first program code may be modified in view of the detected trend, prior to modifying the at least one of the first program code or the configuration data associated with the first program code.

* * * * *